(12) United States Patent
Seymour

(10) Patent No.: US 7,872,802 B2
(45) Date of Patent: Jan. 18, 2011

(54) REINFORCED RETRACTABLE PROJECTION SCREEN WITH A TAB TENSIONING SYSTEM AND A BORDER

(76) Inventor: Chris Seymour, 618 Crystal St., Ames, IA (US) 50010

( * ) Notice: Subject to any disclaimer, the term of this patent is extended or adjusted under 35 U.S.C. 154(b) by 238 days.

(21) Appl. No.: 12/201,327

(22) Filed: Aug. 29, 2008

(65) Prior Publication Data

US 2010/0053746 A1 Mar. 4, 2010

(51) Int. Cl.
*G03B 21/56* (2006.01)
(52) U.S. Cl. .................................... 359/461
(58) Field of Classification Search ........... 359/443, 359/461; 160/23.1, 378, 120–121
See application file for complete search history.

(56) References Cited

U.S. PATENT DOCUMENTS

| | | | |
|---|---|---|---|
| 1,701,590 A * | 2/1929 | Oliver et al. ............... | 359/450 |
| 1,819,776 A | 8/1931 | Heck | |
| 1,882,454 A | 10/1932 | Spalding | |
| 2,086,729 A | 7/1937 | Moss | |
| 2,187,904 A * | 1/1940 | Hurley ...................... | 359/445 |
| 2,379,499 A | 7/1945 | Smith | |
| 3,125,927 A | 3/1964 | Erban | |
| 4,006,771 A | 2/1977 | Spurkel | |
| 4,406,519 A | 9/1983 | Shaw | |
| 6,552,847 B2 | 4/2003 | Congard | |
| 7,397,603 B2 * | 7/2008 | Peterson et al. ............ | 359/443 |
| 2008/0030853 A1 * | 2/2008 | Creel ....................... | 359/461 |
| 2008/0174865 A1 * | 7/2008 | Stewart ..................... | 359/450 |

FOREIGN PATENT DOCUMENTS

JP 05273647 * 10/1993

OTHER PUBLICATIONS

Draper Premier CAD drawings Mar. 2006.*
DA-LITE Designer DA-TAB Electrol specification data sheet Feb. 2008.*

* cited by examiner

*Primary Examiner*—Christopher Mahoney
(74) *Attorney, Agent, or Firm*—Marc E. Hankin; Kevin Schraven; Hankin Patent Law, APC

(57) ABSTRACT

Various embodiments of this invention disclose a retractable projection screen with a tab tensioning system, a textured textile border that is made from a different material as the screen, an adjustable coupling means, and a metal strip.

7 Claims, 3 Drawing Sheets

REINFORCED RETRACTABLE PROJECTION SCREEN WITH A TAB TENSIONING SYSTEM AND A BORDER

BACKGROUND OF THE INVENTION

This invention generally relates to retractable projection screens. Moreover, it pertains specifically to a reinforced retractable projection screen with tab tensioning. The border material of the screen is textile or fabric and is attached to the screen at the edges in a non-overlapping manner. The retractable projection screen also has an adjustable coupling device and strips of metal.

Projection screens are typically made of vinyl or some other elastic material that both reflects a projected image and may or may not provide acoustic transparency. Vinyl is also typically used for retractable projection screens because it is easily folded or rolled. However, this ability to fold and roll means that retractable projection screen may also exhibit distortions or waviness if improperly handled or stored or if the loads on the screen are distributed in an uneven fashion. A common method to improve the flatness and reduce the distortion and noticeable waves in a retractable projection screens is through the use of a tab tensioning system. Current tab tensioning systems commonly employ the use of a weight bar along the bottom to pull the projection screen down in a uniform manner. Additionally, the sides of the screen have tabs that project horizontally out that a cable is passed through. The cable, when taut, creates an arc shape along the sides of projection screen. In this manner, the projection screen is held flat.

Traditionally, retractable projection screens are made using a vinyl screen material that may or may not be supported by fabric. If the vinyl screen lacks reinforcing fiber threads either within or behind the vinyl, it is commonly called non-reinforced vinyl or non-reinforced screen material. Non-reinforced vinyl projection screens require a tensioning system, because vinyl is not mechanically strong enough to hold a weight bar, and will stretch down and deform over time. A tab tensioning system distributes the forces from the weight bar evenly around the screen material and prevents the deformation of the vinyl screen.

The borders for a non-reinforced vinyl screen are typically differentiated from the screen, or image surface, and painted black. The black paint absorbs some of the spill over projection light so this stray light is not reflected back in a distracting way to the audience viewing the projected image. Additionally, the black paint helps to hide any tension tabs from view. Paint is used because it does not significantly add to the thickness of the screen as it retracts. Differences in thickness between the visual screen area and the black border area cause the vinyl to deform along the sides of the screen resulting in significant distortion waves, which are visible after retraction and may not be corrected by the tab tensioning system. The tensioning tabs are typically attached to the screen within the black border area to avoid any minor tension deformities, and so that the tabs are not easily visible.

Retractable vinyl projection screens that have internal fiber reinforcement or fiber reinforcement backing typically do not have tab tensioning systems. These projection screens are referred to as reinforced vinyl projection screens or reinforced material projection screens. The reinforced vinyl projection screen is capable of mechanically holding the weight of the bottom weight bar, or batten, without having to distribute the tensioning forces horizontally via a tab tensioning system. As such, a tab tension system is not required. A reinforced vinyl projection screen, to a certain extent, resists the distortion forces and does not benefit as much as a non-reinforced vinyl projection screen from a costly multi-tab tensioning system. However, reinforced vinyl projection screens can distort over time, and could benefit from a simple and inexpensive tab tensioning system.

Reinforced vinyl projection screen surfaces are often mechanically similar to common blackout cloth, or they are made from woven vinyl coated threads similar to a solar shade material. Importantly, this latter type of material provides acoustic transparency. The borders for these screens are typically masked from the image or projection surface and painted black for the same benefits as described above. Projection screen manufacturers prefer paint over fabric border materials because paint does not significantly add to the thickness of the screen as it retracts and thus cause distortions.

The black paint used to absorb the spill over light from the projection is not an ideal solution. The ideal border material for a retractable projection screen would have infinite light absorption. Although no such material exists yet, generally, a textured textile or cloth, such as velvet, velveteen, velour, felt, a flocked material, or a suede material will absorb many times more light than black paint. These high light absorbing textured textiles, typically dyed black, are the preferred choice for fixed-frame projection screen designs. The disadvantage of overlaying a textile or cloth boarder material onto the vinyl screen of a retractable projection screen is that the material is much thicker than black paint, and inevitably causes a non-uniform roll-up of the projection screen. When the projection screen is unrolled the distortions caused by the different thicknesses are often visible and may become permanent over time.

Thus, there is a need in the art for a reinforced projection screen with a textile or cloth border that has a uniform thickness across the entire width of the projection screen and that is adaptable to an inexpensive tab tensioning system.

BRIEF SUMMARY OF THE INVENTION

To minimize the limitations in the prior art, and to minimize other limitations that will become apparent upon reading and understanding the present specification, the present invention discloses a reinforced retractable projection screen with a textile or cloth border and a tab tensioning system.

One embodiment of this invention is a retractable projection screen, comprising: a retractor, a screen, a weight bar, one or more tension cables, and one or more tension tabs. The tension cables have a top end and a bottom end, and the bottom end is connected to the weight bar. The tension tabs are connected to the tension cables such that they pull horizontally away from the screen and provide horizontal tension to the tension tabs and screen. The screen has at least a top edge, a bottom edge, a left edge, and a right edge, and it retracts into the retractor when retracted. The tension cables have a left side and a right side which are found on the left and right edges of the screen. The tension tabs are connected to the screen at the right and left edges of the screen. The retractable projection screen also has one or more strips of metal that increases the flatness of the screen. These strips of metal are attached to the screen just proximal to where the screen and tab connect. The retractable projection screen also has a border that is attached to the screen in a side by side manner. The border and the screen do not overlap. The border and the screen are made from different materials, but share similar thicknesses. The border material is dark in color and has a high surface area texture. The retractable projection screen also has one or more coupling devices that have two ends, a distal end and a proximal end. The distal end is attached to the weight bar and the proximal end is attached to either the screen or the border.

Another embodiment of the invention only has the textile border features, and not the tab tension, strips of metal, or coupling device features.

Another embodiment of the invention only has the coupling device features, and not the textile border, tab tension, or strips of metal features.

Another embodiment of the invention only has the tab tension features, and not the strips of metal, textile border, or coupling device features.

An object of the present invention is to provide a retractable projection screen that will overcome the deficiencies of the prior art.

Another object of the present invention is to provide a retractable projection screen that has a textile or cloth border that absorbs more spill over projection light than a black paint border.

Another object of the present invention is to provide a retractable projection screen with an inexpensive tab tensioning system.

Other features and advantages are inherent in the reinforced retractable projection screen claimed and disclosed will become apparent to those skilled in the art from the following detailed description and its accompanying drawings.

DETAILED DESCRIPTIONS OF THE DRAWINGS

In the following detailed description of the preferred embodiment, reference is made to the accompanying drawings that form a part hereof, and in which is shown by way of illustration a specific embodiment in which the invention may be practiced. It is to be understood that other embodiments may be utilized and structural changes may be made without departing from the scope of the present invention.

In the following detailed description of various embodiments of the invention, numerous specific details are set forth in order to provide a thorough understanding of various aspects of one or more embodiments of the invention. However, one or more embodiments of the invention may be practiced without these specific details. In other instances, well-known methods, procedures, and/or components have not been described in detail so as not to unnecessarily obscure aspects of embodiments of the invention.

In the following description, certain terminology is used to describe certain features of one or more embodiments of the invention. For instance "textile" or "cloth" are interchangeable terms for purposes of this invention and refer to any woven, knitted, or pulp mineral, plant, animal, composite, or synthetic material, including, but not limited to, cotton, wool, vinyl, polyester, paper, or hemp.

Figure 1:
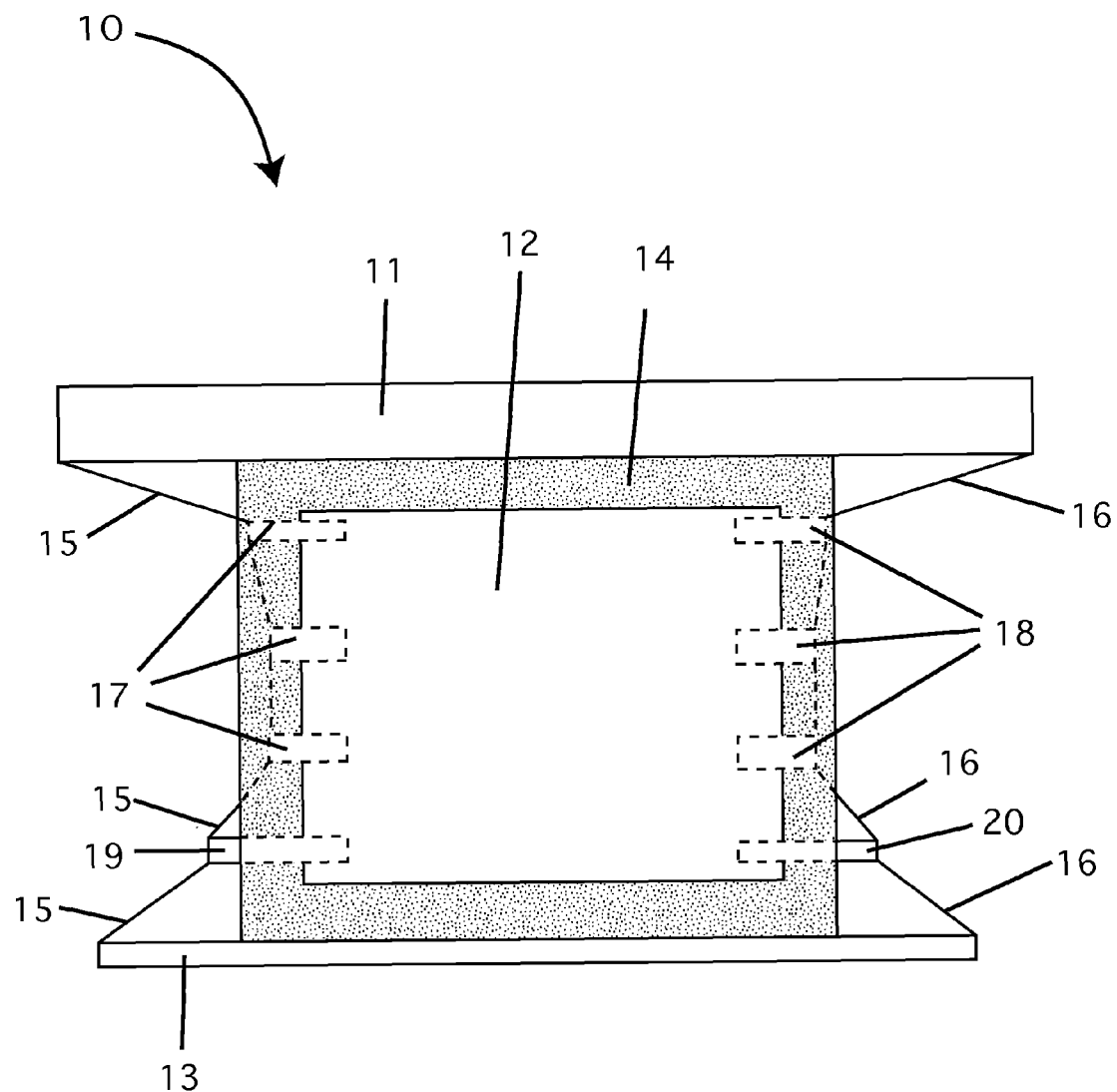
FIG. 1 is an illustration of the front of one embodiment of the retractable projection screen.

FIG. 1 is an illustration of the front of one embodiment of the retractable projection screen. In FIG. 1, retractable projection screen 10 is shown with retractor 11, screen 12, weight bar 13, border 14, cables 15 and 16, and tension tabs 17, 18, 19 and 20. Retractor 11 is preferably an automatic or motorized retraction device, but it can retract through any means without deviating from the scope of the invention including but not limited to, a spring, a pulley, or a manual crank mechanism. Additionally, retractor 11, if motorized or automatic, may be powered by any means including, but not limited to, AC power, DC or battery power, compressed air, or pneumatic power. FIG. 1 shows how screen 12 preferably retracts into retractor 11 by ascending in an upward direction. However, screen 12 may retract into retractor 11 from any direction including sideways or downward, and screen 12 need not retract at a right angle to retractor 11.

Screen 12 and border 14 preferably retract simultaneously into retractor 11. When screen 12 and border 14 are completely, retracted weight bar 13 preferably rests just outside and flush with retractor 11.

Screen 12, as shown in FIG. 1, is preferably rectangular in shape but may be any geometric or irregular shape without deviating from the scope of this invention. FIG. 1 shows Screen 12 and border 14, as preferred, with a top edge, a bottom edge, a left edge, and a right edge. Although screen 12, as shown in FIG. 1, has border 14 on all sides, retractable projection screen 10 may have no border 14, border 14 on only one side, or border 14 on any number of sides without deviating from the scope of this invention. The bottom edge of screen 12 may be directly connected to weight bar 13 and the top edge of screen 12 may be directly connected to retractor 11. Additionally, screen 12 may also be connected to weight bar 13 and retractor 11 in conjunction with border 14. However, as shown in FIG. 1, screen 12 is preferably connected in an indirect manner to weight bar 13 and retractor 11 through border 14. In this manner, border 14 typically acts as an intermediary to connect screen 12 to weight bar 13 and to retractor 11. Because screen 12 may be any geometric or irregular shape the edges of screen 11 may not be the perpendicular lines found in a rectangle, but instead, may be a curvature or even a single point. The outer most boundary of screen 12 in the direction indicated can be a pinnacle point on a curvature or can be as small as a single point. For example, an edge can be a single point if the outer most boundary of the left is the junction of two lines. In another example if the left edge is concave or an outward arc, such as would be found on a circular screen, the outer most point of the arc would be or would act as the left edge. Similarly, an edge may also be two or more separated points, such as would be found if screen 11 had a side that was concave or scalloped.

Screen 12 is preferably reinforced vinyl, but can be non-reinforced vinyl, or any other natural or synthetic material, textile, or cloth. Additionally, screen 12 is preferably white or light in color and highly reflective of a projected image, but screen 12 may be a wide range of colors or reflectivity so long as it is suitable as a projection screen.

Although reinforced material (such as vinyl) retractable projection screens typically do not require tab tensioning, they often show an appreciable improvement in flatness from a tab tensioning system. As shown in FIG. 1, retractable projection screen 10 preferably has two tension cables 15 and 16 and eight tension tabs 17, 18, 19 and 20, with tension tabs 17 and 19 on the left of screen 12 and tension tabs 18 and 20 on the right of screen 12. However, retractable projection screen 10 can have as few as zero tension cable or as many as thousands of tension cables. Additionally, retractable projection screen 10 can have as few as zero tension tabs or as many as thousands of tension tabs. FIG. 1 shows how tension cables 15 and 16 are preferably attached to retractor 11 and to the ends of weight bar 13. However, the tension cables may attach at any position along the weight bar without deviating from the scope of the invention as long as tension is created. Additionally, tension cables 15 and 16 may also attach to some other object that retractable projection screen 10 is near or mounted on, such as a wall. As shown in FIG. 1, tension cables 15 and 16 preferably cause horizontal tension on the screen 12 and tension tabs 17, 18, 19 and 20 because they pass through a loop in tension tabs 17, 18, 19 and 20. Although tension cables 15 and 16 are preferably connected to tension tabs 17, 18, 19 and 20 in a pass though cable-through-loophole manner, tension cables 15 and 16 may be attached or connected to tension tabs 17, 18, 19 and 20 in many other ways, including, but not limited to: straps, zip-ties, chains, clips, binders, bungees, cords, ropes, strings, cables, fasteners, staples, hook and loop, bands, latches, stitches, snaps, wenches, glue, other natural or synthetic chemical adhesives, adhesive tape, heat bonding, chemical bonding, crimps, clamps, or ultrasonic welding.

Figure 2:
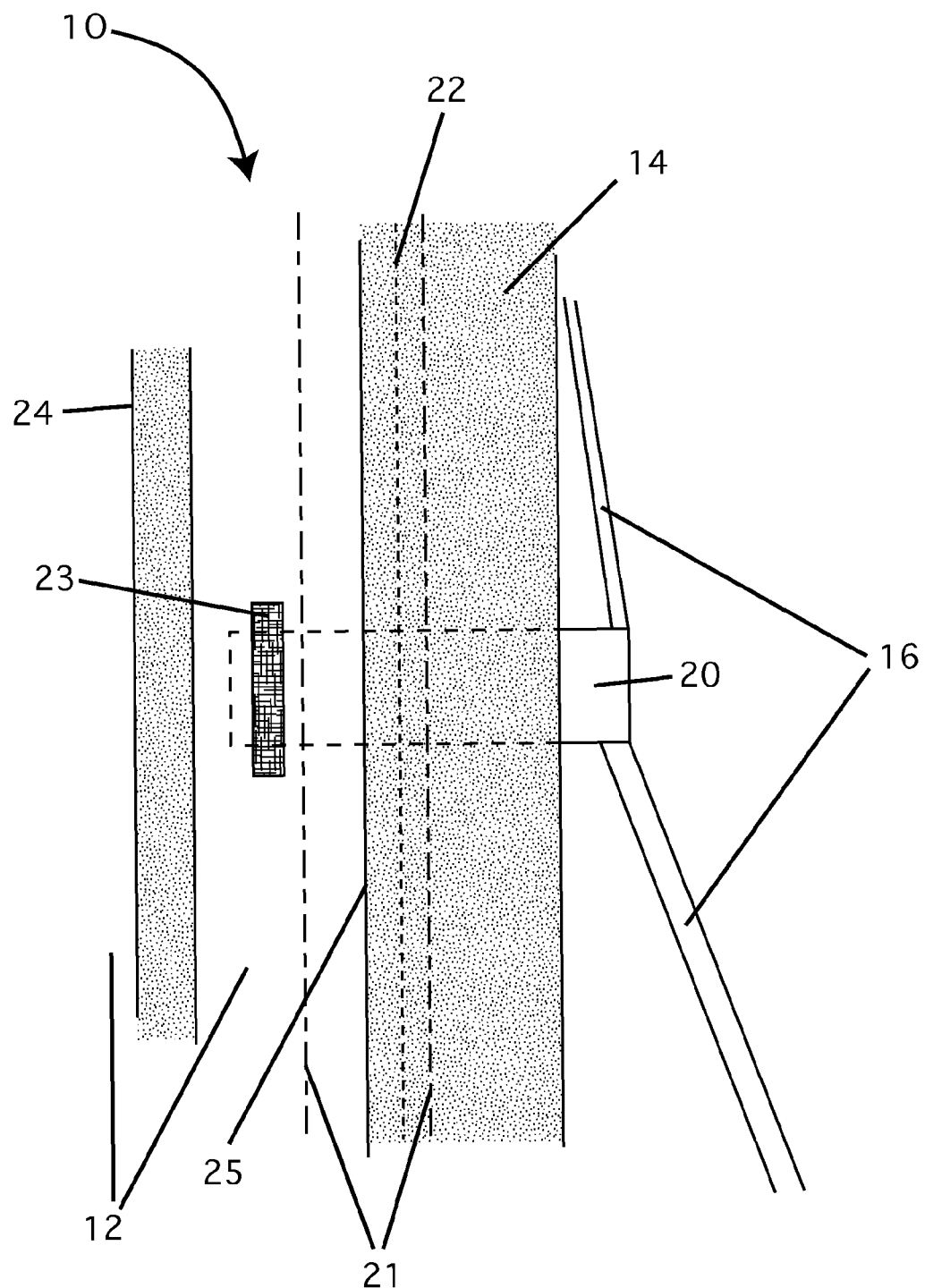
FIG. 2 is a detailed illustration of a portion of the front of one embodiment of the border and screen connection and of the tension tab and screen connection of the retractable projection screen.

Tension tabs 17, 18, 19 and 20, as shown in FIG. 1, are preferably connected to the back of screen 12. Because screen 12 is preferably made from reinforced vinyl, screen 12 is strong enough to withstand the tension applied by tension tabs 17, 18, 19 and 20. Reinforced vinyl screens contain fiber for support, so they can mechanically withstand the forces from tension tabs 17, 18, 19 and 20. Although tension tabs 17, 18, 19 and 20 are preferably connected to the back of screen 12, to reduce interference of the projection image, tension tabs 17, 18, 19 and 20 may be connected to the front or edges of screen 12 and not deviate from the scope of this invention. Tension tabs 17, 18, 19 and 20 are preferably directly connected to screen 12 with stitches, as shown in FIG. 2 below, but can be connected via any connection means, including but not limited to: straps, zip-ties, chains, clips, binders, bungees, cords, ropes, strings, cables, fasteners, staples, hook and loop, bands, latches, stitches, snaps, wenches, glue, other natural or synthetic chemical adhesives, adhesive tape, heat bonding, chemical bonding, crimps, clamps, or ultrasonic welding. Tension tabs 17, 18, 19 and 20 are preferably as thin, short, and narrow as reasonable in order to not introduce excess thickness that may distort screen 12 upon retraction.

As shown in FIG. 1, tension tabs 17, 18, 19 and 20 are preferably attached to screen 12 at an identical height to a counterpart tension tab, which is located on the other side of screen 12. This is preferred so that the tension delivered on the opposing sides of screen 12 counteracts each other and screen 12 is thus made as flat and wave free as possible. However, tension tabs 17, 18, 19 and 20 of retractable projection screen 10 may be placed at uneven heights, and one side of screen 12 may even have more or less tension tabs then the other side of the screen without deviating from the scope of this invention. FIG. 1 also shows that tension tabs 17, 18, 19 and 20 are preferably connected to screen 12 in an essentially evenly spaced manner along both the right edge and left edge of screen 12. This allows screen 12 to have increased flatness due to the evenly spaced tension forces created. However, tension tabs 17, 18, 19 and 20 may be attached in an uneven manner along the side edges of screen 12 without deviating from the scope of the invention.

Because tension tabs 17, 18, 19 and 20 are preferably directly connected to screen 12, and not border 14, this allows the use of a less robust connection or attachment design between the screen 12 and the border 14. Further, this allows the use of a wide range of border fabric or textile types, including textiles that would not be able to withstand the tension forces if tension tabs 17, 18, 19 and 20 where directly connected to border 14. If tension tabs are directly connected to border 14, the material that border 14 would have to be a material that could handle the tension forces. Additionally, the connection between border 14 and screen 12 would have to be strong enough or robust enough to handle the tension forces. However, the tension tabs 17, 18, 19 and 20 may be connected to border 14 without deviating from the scope of this invention if robust material and connection means are employed.

As shown in FIG. 1, tension tabs 17, 18, 19 and 20 preferably project distally away from screen 12. Border 14, if present and connected to screen 12 as shown in FIG. 1, is preferably in front of tension tabs 17, 18, 19 and 20. In this manner border 14 conceals, or hides from view, some or all of the visible surface area of tension tabs 17, 18, 19 and 20. In this position, the viewer is less distracted by tension tabs 17, 18, 19 and 20. Additionally, as shown in FIG. 1, tension tabs 17 and 18 are completely concealed from view because border 14 is wide enough to cover tension tabs 17 and 18 as they project distally away from screen 12. Moreover, FIG. 1 shows that because tension tabs 17 and 18 are concealed, a significant portion of tension cables 15 and 16, as preferred, are also concealed behind border 14. Although FIG. 1 shows a specific pattern of concealed and visible tension tabs, all, none, or any number of the tension tabs may be concealed or visible without deviating from the scope of the invention.

Screen 12 and border 14 preferably have the same or similar thicknesses, so that when screen 12 and border 14 are retracted, any difference in thickness does not cause distortion. Typically, border 14 will be made from a textile or cloth material that is the same or a similar thickness to screen 12. Border 14 is preferably a black or very dark color and should absorb as much light as possible. Preferably, border 14 is made of a textured textile, including but not limited to: velvet, velour, velveteen, suede, felt, flocked material or other rough, high surface area texture material. These materials are preferred because they absorb more light than a flat and potentially shiny surface that has merely been painted black. However, border 14 may be made from any material and have any texture without deviating from the scope of this invention.

FIG. 2 is a detailed illustration of a portion of the front of one embodiment of the border and screen connection and of the tension tab and screen connection of the retractable projection screen. As shown in FIG. 2, retractable projection screen 10 has screen 12, border 14, tension cable 16, tension tab 20, screen/border joint tape 21, screen/border stitch 22, screen/tab stitch 23, and strip of metal 24, and screen/border joint 25. FIG. 2 shows that tension tab 20 passes behind border 14 and is attached or connected to screen 12 via screen/tab stitch 23. However, as discussed above, tension tab 20 may be connected to screen 12 in many different ways.

FIG. 2 also shows the preferred way of connecting border 14 to screen 12. Border 14 and screen 12 are joined at screen/border joint 25 by screen/border joint tape 21, which is a strip of tape or by a strip of very thin textile that overlaps both border 14 and screen 12. This way border 14 and screen 12, which may be made from relatively thick materials, do not have to overlap and cause potential distortions upon retraction. As shown in FIG. 2, screen/border stitch 22 provides an additional reinforcement connection between the screen/border joint tape 21 and border 14. Although screen/border joint tape 21 is preferably a reinforced or textile tape, it may be made out of any material and may be connected to screen 12 and border 14 using any connection means, including but not limited to: straps, zip-ties, chains, clips, binders, bungees, cords, ropes, strings, cables, fasteners, staples, hook and loop, bands, latches, stitches, snaps, wenches, glue, other natural or synthetic chemical adhesives, adhesive tape, heat bonding, chemical bonding, crimps, clamps, or ultrasonic welding. Additionally, screen/border stitch 22 may reinforce only the screen/border joint tape 21 and screen 12 connection, and not the screen/boarder joint tape 21 and border 14 connection, or it may reinforce both or neither of the connections, without deviating from the scope of this invention.

Border 14 and screen 12 may be connected via an overlap without deviating from the scope of this invention. If border 14 and screen 12 are connected via an overlap, it is preferred that screen 12 is connected to the back of border 14 so that the connection means is less visible. Finally, if border 14 and screen 12 are connected via an overlap, screen/border joint tape 21 may be used, but is unnecessary because screen 12 and border 14 may be directly connected to each other by such means including, but not limited to: straps, zip-ties, chains, clips, binders, bungees, cords, ropes, strings, cables, fasteners, staples, hook and loop, bands, latches, stitches, snaps, wenches, glue, other natural or synthetic chemical adhesives, adhesive tape, heat bonding, chemical bonding, crimps, clamps, or ultrasonic welding.

Even with the use of a tab tension system, screen 12 may still show some distortion. This distortion can be further reduced, as shown in FIG. 2, by preferably incorporating a thin vertical strip of metal 24 behind, or woven into, screen 12 in an area just proximal of where tension tab 20 connects to screen 12. Strip of metal 24 helps even out any residual distortions caused by tension tab 20. Although strip of metal 24 is preferably attached to screen 12 with an adhesive, strip of metal 24 may be attached to screen 12 by any connection means, including, but not limited to: straps, zip-ties, chains, clips, binders, bungees, cords, ropes, strings, cables, fasteners, staples, hook and loop, bands, latches, stitches, snaps, wenches, glue, other natural or synthetic chemical adhesives, adhesive tape, heat bonding, chemical bonding, crimps, clamps, or ultrasonic welding. Finally, strip of metal 24 should be as thin, narrow and short as possible to prevent distortion during retraction.

Figure 3:
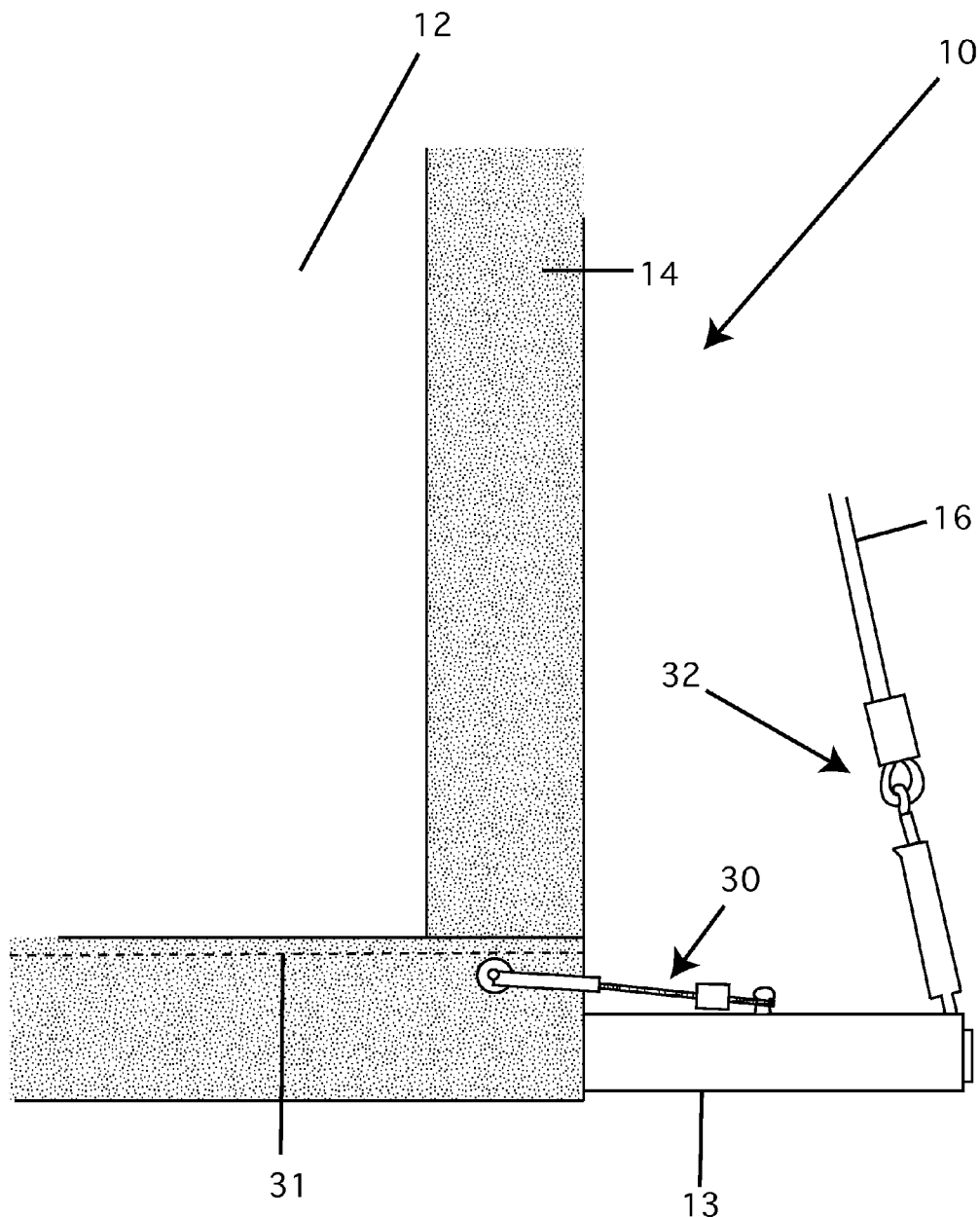
FIG. 3 is a detailed illustration of a portion of the front of one embodiment of an adjustable turnbuckle tension device attached to a bottom corner of the screen or border of the retractable projection screen.

FIG. 3 is a detailed illustration of a portion of the front of one embodiment of an adjustable turnbuckle tension device attached to a bottom corner of the screen or border of the retractable projection screen. The retractable projection screen 10, as shown in FIG. 3, has screen 12, border 14, weight bar 13, tension cable 16, adjustable turnbuckle 30, weight bar stitch 31 and tension cable/weight bar connector 32. As shown in FIG. 3, tension cable 16 is preferably attached to the end of weight bar 13. Tension cable/weight bar connector 32 is a preferred example of an adjustable turnbuckle device used to connect tension cable 16 to weight bar 13. However, tension cable 16 may be connected to weight bar 13 in many ways, including, but not limited to: straps, zip-ties, chains, clips, binders, bungees, cords, ropes, strings, cables, fasteners, staples, hook and loop, bands, latches, stitches, snaps, wenches, glue, other natural or synthetic chemical adhesives, adhesive tape, heat bonding, chemical bonding, crimps, clamps, or ultrasonic welding.

Typically, weight bar 13 is connected to screen 12 or border 14 by rolling the bottom edge of screen 12 or border 14 around weight bar 13 and then attaching the bottom edge back on to itself. This is known as a weight bar pocket design. FIG. 3 shows a weight bar pocket design that has been formed by wrapping border 14 around weight bar 13 and connecting border 14 to itself by weight bar stitch 31. This design may leave weight bar 13 loose within the pocket and thus allow screen 12 to shift or distort inadvertently. Such a design may benefit from a horizontal tension force being applied along the bottom edge of screen 12. As shown in FIG. 3, the bottom corner of border 14 is preferably mechanically coupled to weight bar 13 using adjustable turnbuckle 30. Such adjustable turnbuckles are common and well known in the art. Alternatively, weight bar 13 may be mechanically coupled to screen 12, instead of border 14, or to both screen 12 and border 14, without deviating from the scope of this invention. Additionally, weight bar 13 may be mechanically coupled to border 14 or screen 12 in many different ways, including, but not limited to: straps, zip-ties, chains, clips, binders, bungees, cords, ropes, strings, cables, fasteners, staples, hook and loop, bands, latches, stitches, snaps, wenches, glue, other natural or synthetic chemical adhesives, adhesive tape, heat bonding, chemical bonding, crimps, clamps, or ultrasonic welding. Although not shown in FIG. 3, retractable projection screen 10 preferably has two coupling devices, one on the right and one on the left. However, the present invention may have as few as zero coupling devices or as many as several thousand coupling devices without deviating from the scope of the invention.

An adjustable coupling device, such as adjustable turnbuckle 30, is important because it allows the user to increase or decrease the tension to make screen 12 as flat as possible. However, a fixed length coupling device may be used without deviating from the scope of the invention.

Weight bar 13 may also be attached to screen 12 or border 14 in other ways besides a weight bar pocket design, including, but not limited to: a clutch roller-clamp, crimp bar retention, straps, zip-ties, chains, clips, binders, bungees, cords, ropes, strings, cables, fasteners, staples, hook and loop, bands, latches, stitches, snaps, wenches, glue, other natural or synthetic chemical adhesives, adhesive tape, heat bonding, chemical bonding, crimps, clamps, or ultrasonic welding. If the attachment or connection means does feature a device such as a crimped bar retention that restricts horizontal movement of the screen 12 or border 14 along the bottom edge, the retractable projection screen 10 may not benefit from an additional horizontal tension force being applied along this bottom edge.

In summary, the present invention is a retractable projection screen with a textured textile border, a tab tensioning system, strips of metal, and an adjustable coupling means.

The foregoing description of the preferred embodiment of the invention has been presented for the purposes of illustration and description. While multiple embodiments are disclosed, still other embodiments of the present invention will become apparent to those skilled in the art from the above detailed description, which shows and describes illustrative embodiments of the invention. As will be realized, the invention is capable of modifications in various obvious aspects, all without departing from the spirit and scope of the present invention. Accordingly, the detailed description is to be regarded as illustrative in nature and not restrictive. Also, although not explicitly recited, one or more embodiments of the invention may be practiced in combination or conjunction with one another. Furthermore, the reference or non-reference to a particular embodiment of the invention shall not be interpreted to limit the scope the invention. It is intended that the scope of the invention not be limited by this detailed description, but by the claims and the equivalents to the claims that are appended hereto.

What is claimed is:

1. A retractable projection screen comprising:
   a retractor,
   a screen,
   a weight bar,
   one or more tension cables, and
   one or more tension tabs;

wherein said one or more tension cables have a top end and a bottom end, and said bottom end is connected to said weight bar;

wherein said one or more tension tabs are connected to said one or more tension cables such that said one or more tension cables pull horizontally away from said screen and provide horizontal tension to said screen and said one or more tension tabs;

wherein said screen has at least a top edge, a bottom edge, a left edge, and a right edge;

wherein said screen retracts into said retractor when retracted;

wherein there are two said one or more tension cables, a left side tension cable, which is on a left side of said left edge of said screen, and a right side tension cable, which is on a right side of said right edge of said screen;

wherein said one or more tension tabs are connected to said right edge of said screen and said left edge of said screen;

one or more strips of metal;

wherein said one or more strips of metal increase a flatness of said screen; and wherein said one or more strips of metal are attached to said screen proximal to one or more screen/tension tab connection areas.

2. The retractable projection screen of claim 1, further comprising:

a border.

3. The retractable projection screen of claim 2, wherein said border is attached to said screen in a side by side manner; and wherein said border does not overlap with said screen.

4. The retractable projection screen of claim 3, wherein said border is made from a border material;

wherein said screen is made from a screen material; and wherein said border material and said screen material are different.

5. The retractable projection screen of claim 4, wherein a thickness of said border is similar to a thickness of said screen.

6. The retractable projection screen of claim 5, wherein said border material is a dark color and has a high surface area texture.

7. The retractable projection screen of claim 6, further comprising:

one or more coupling devices;

wherein said one or more coupling devices have a distal end and a proximal end;

wherein said distal end is attached to said weight bar; and wherein said proximal end is attached to said screen or said border.

* * * * *